United States Patent

[11] 3,620,646

[72] Inventors: Paul D. Stevenson, Ann Arbor; Leon A. Tucholski, Belleville, both of Mich.
[21] Appl. No.: 51,572
[22] Filed: July 1, 1970
[45] Patented: Nov. 16, 1971
[73] Assignee: General Motors Corporation, Detroit, Mich.

[54] CENTRAL HYDRAULIC SYSTEM FOR A VEHICLE
3 Claims, 1 Drawing Fig.

[52] U.S. Cl. .................................................... 417/79, 137/101, 137/117, 60/52 S, 417/88, 417/310
[51] Int. Cl. .................................................. G05d 11/00, F04b 23/04, F04b 49/00
[50] Field of Search ......................................... 417/310, 308, 304, 79, 83, 88; 60/52 S; 137/101 X, 117 X, 118

[56] References Cited
UNITED STATES PATENTS
| | | | |
|---|---|---|---|
| 2,983,226 | 5/1961 | Livermore | 417/79 |
| 3,385,311 | 5/1968 | Allen | 137/101 |

Primary Examiner—Carlton R. Croyle
Assistant Examiner—Richard E. Gluck
Attorneys—W. E. Finken, A. M. Heiter and R. L. Phillips ABSTRACT: In a vehicle having an automatic transmission and power steering, there is provided a central hydraulic system wherein flow from a pump is directed to a first flow-control valve which delivers flow up to a predetermined rate to a second flow-control valve while delivering any excess fluid flow to an aspirator which acts to supercharge the pump. The second flow-control valve delivers flow up to a predetermined lower rate to the power steering system while delivering any excess fluid flow to the transmission control system which is also receiving all of the flow from the power steering system.

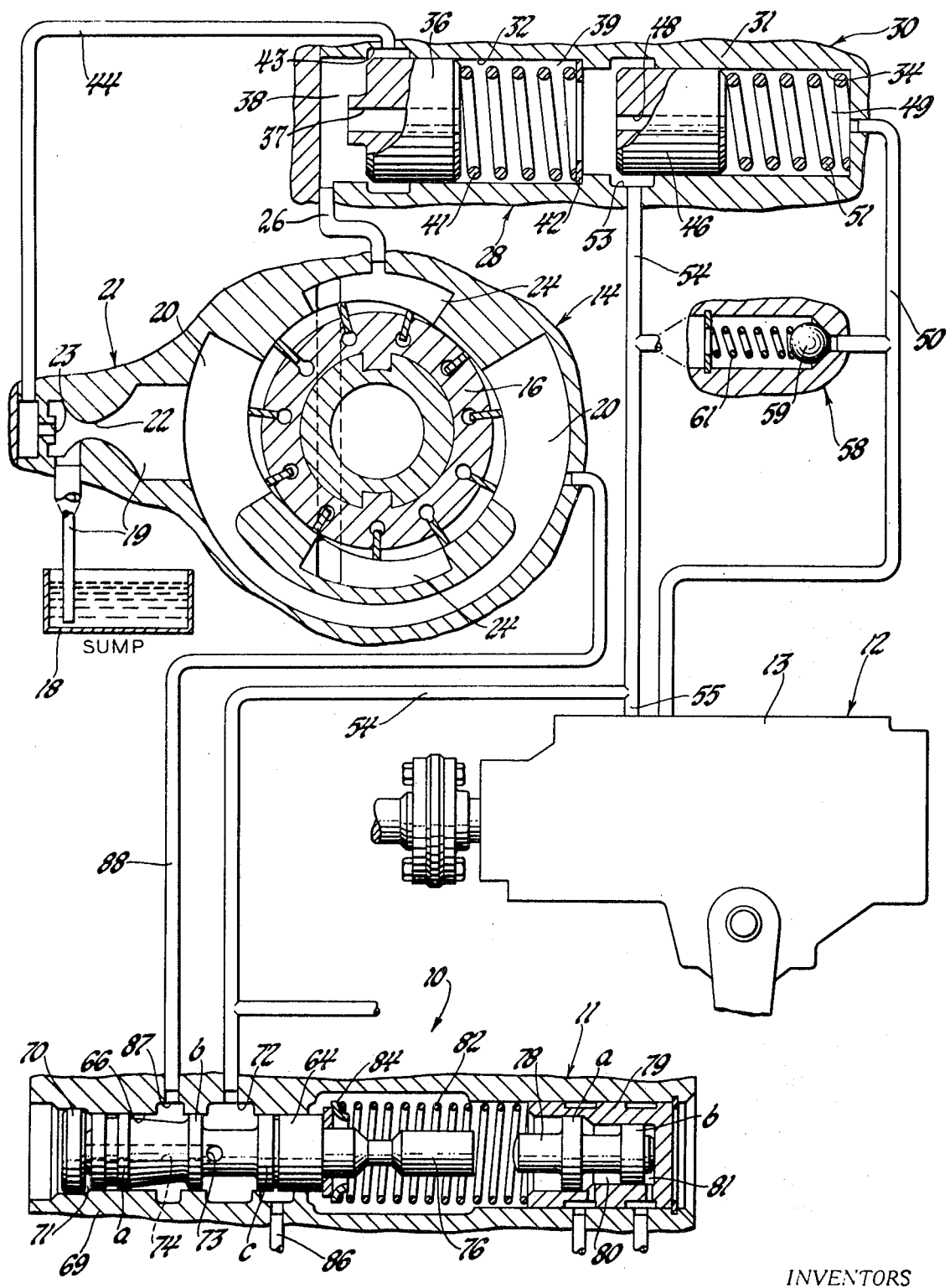
INVENTORS
Paul D. Stevenson &
BY Leon A. Tucholski
Ronald L. Phillips
ATTORNEY

CENTRAL HYDRAULIC SYSTEM FOR A VEHICLE

This invention relates to central hydraulic systems for vehicles and more particularly to such systems for vehicles having both power steering and an automatic transmission.

In a vehicle having both an automatic transmission and power steering wherein it is desired to have a single engine-driven pump supply fluid to both of these devices, difficulties arise because the flow from the pump increases with speed and because of the different flow rate requirements of the transmission control system and power steering system. For example, the pump's capacity is normally sized to meet the flow rate requirements of the systems at low engine speed but then at high engine speed the increased pump flow may exceed the pressure-regulating ability of the transmission control system and thereby affect transmission shift timing. In addition, the pump may be supercharged to avoid cavitation at high engine speeds; however, high pressures not limited by transmission control pressure are desired to effect very efficient supercharging action.

The central hydraulic system according to the present invention employs a single pump for supplying fluid to both a power steering system and an automatic transmission's control system. The pump which is engine driven and located in the transmission delivers fluid to a first flow valve which delivers flow up to a predetermined flow rate value to a second flow-control valve and delivers any excess flow to an aspirator in the pump's inlet to supercharge the pump. The second flow-control valve delivers fluid to the power steering system up to a predetermined flow rate value lower than that of the first flow-control valve with the remainder of the flow being directed to the transmission control system where transmission control pressure is regulated by a pressure-regulator valve. The transmission control system also receives all of the fluid that is directed to the power steering system and any excess fluid flow to the transmission control system is exhausted by the pressure-regulator valve to the pump's inlet. Thus, the transmission control system's pressure-regulator valve is never required to handle more than the controlled fluid flow rate provided by the first flow-control valve while the aspirator is permitted to use a pressure higher than the transmission control pressure to effect the supercharging action.

An object of the present invention is to provide a new and improved central hydraulic system for a vehicle.

Another object is to provide a central hydraulic system for a vehicle having a power steering system and a transmission control system wherein different controlled flow rates are provided to these systems form a single pump for limiting the quantity of fluid handled by the transmission control system while assuring sufficient flow for the power steering system and in addition there is provided by one of the controlled flow rates an excess fluid flow that is used to supercharge the pump with a pressure independent of the pressure in the transmission control system.

Another object is to provide in a central hydraulic system for a vehicle having a power steering system and an automatic transmission control system a first flow-control valve that controls the amount of fluid flow from an engine driven pump to a second flow-control valve by delivering excess flow to supercharge the pump and with the second flow-control valve controlling the amount of flow to the power steering system by delivering any excess fluid flow to the transmission control system which receives all of the flow from the power steering system and where pressure is regulated by a pressure regulator valve that directs excess fluid back to the pump.

These and other objects of the present invention will become more apparent from the following description and drawing which diagrammatically shows an embodiment of the central hydraulic system according to the present invention.

The central hydraulic system according to the present invention is illustrated incorporated in a vehicle having an automatic transmission including a control system therefor which is generally indicated at 10 and has a pressure-regulator valve 11. The automatic transmission control system including pressure-regulator valve 11 may be of the type disclosed in U.S. Pat. No. 3,321,056 granted May 23, 1967 to Winchell et al. and entitled "Transmission and Control System." The vehicle further has a power steering gear which is generally indicated at 12 and includes a power steering system 13. The power steering system may be of the type disclosed in U.S. Pat. No. 3,022,772 granted Feb. 27, 1962 to Philip B. Zeigler et al. and entitled "Rotary Power Steering Valve with Torsion Bar Centering."

Hydraulic fluid such as oil used in the central hydraulic system is supplied under pressure by a positive displacement-type pump 14 which is located in the transmission and may be of the vane type shown and of any appropriate design. The pump's rotor 16 is driven by the vehicle's engine by a pump drive such as that disclosed in the aforementioned Winchell et al. patent and on such operation, draws fluid from a sump 18 through a pump inlet passage 19 which directs it to the pump's twin-inlet chambers 20. An aspirator generally indicated at 21 having a throat 22 located in the pump's inlet passage 19 and operated by fluid directed through a nozzle 23 provides for supercharging the pump as described in more detail later. Fluid from inlet chambers 20 is discharged by the pumping action to twin-outlet chambers 24 from which the fluid is delivered via a pump outlet passage 26 to two series arranged flow-control valves 28 and 30.

The flow-control valves 28 and 30 have a common valve body 31 having a stepped valve bore providing a large diameter bore portion 32 and a small diameter bore portion 34. The flow-control valve 28 further comprises a cylindrical valve element 36 which is located for reciprocal movement in the large diameter bore portion 32 and has a central passage 37 extending axially therethrough. Central passage 37 provides a flow-restrictive connection between an expansible chamber 38 at the left end of valve element 36 and an expansible chamber 39 at the right end of this valve element. A spring 41 located in chamber 39 and seated on a ring 42 located against the bore's step biases valve element 36 leftward to contract chamber 38 and expand chamber 39 with such leftward movement being limited by the valve element 36 engaging the closed left end of the large diameter bore portion 32. The pump outlet passage 26 is connected to the inlet of the flow-control valve 28 by being connected to the left end of chamber 38 so that pump pressure thus acts in chamber 38 rightward on valve element 36. The flow-restrictive passage 37 provides restriction to flow to the chamber 39 which is the outlet of the flow-control valve 28 with the result that during flow a pressure differential will occur across valve element 36 and urge this valve element rightward against the bias of spring 41. When this pressure differential is large enough to move the valve element 36 sufficiently rightward as described in more detail, the chamber 38 and thus the pump outlet passage 26 is opened past the left end of valve element 36 to an exhaust port 43 as shown which port is connected to an exhaust passage 44. Exhaust passage 44 is connected via the nozzle 23 to direct fluid to the throat 22 of the aspirator 21 for pump supercharging action.

Flow-control valve 30 comprises a cylindrical valve element 46 which has a diameter smaller than that of valve element 36 and is located in the small diameter bore portion 34. Valve element 46 has a central passage 48 extending axially therethrough that provides a flow-restrictive connection between expansible chamber 39 which is at the left end of this valve element and an expansible chamber 49 which is at the right end of this valve element. Chamber 39 which is thus between valve elements 36 and 46 is the inlet to flow-control valve 30 and chamber 49 which is the outlet of this valve is connected by a passage 50 to the inlet of the power steering system 13. A spring 51 located in chamber 49 urges valve element 46 leftward with such leftward movement being limited by the valve element abutting ring 42. The flow-restrictive passage 48 has a smaller flow area that the flow-restrictive passage 37 of flow-control valve 28 and provides restriction to flow therethrough to the power steering system 13 with the result that a pressure differential will occur across valve element 46 to urge this valve element rightward against the bias of spring 51. When this pressure differential is large enough to move valve element 46 sufficiently rightward as described in more detail later, the chamber 39 which receives the controlled flow from the flow-control valve 28 is opened past the left end of valve element 46 as shown to an exhaust port 53 that is connected to a passage 54 that carries main pressure for the transmission control system. The outlet of the power steering system 13 is also connected to the transmission main pressure passage 54 by a passage 55.

Power steering system pressure relief is provided by a check valve 58 comprising a ball 59 which is normally biased to the closed position shown by a spring 61. When power steering pressure acting passage 50 is sufficient to move ball 59 off its seat, fluid from chamber 49 of flow-control valve 30 flows through check valve 58 to the transmission main pressure passage 54. This causes a pressure drop across flow-restrictive passage 48 so that the valve element 46 is acted on by an increased pressure differential resulting in an increased flow through exhaust port 53 to passage 54 for the pressure relief.

The pressure of the fluid in the transmission main pressure passage 54 is regulated by the pressure-regulator valve 11. The pressure-regulator valve 11 comprises a spool valve element 64 having three spaced lands a, b and c of equal diameter located in a bore 66 of valve body 69. A plug 70 located in the left end of bore 66 limits leftward travel of valve element 64 and also closes the bore at this end to provide a chamber 71. The transmission main pressure passage 54 is continuously connected to deliver fluid at a regulated pressure to the remainder of the transmission control system which exhausts the fluid after use to sump 18. Passage 54 is also connected to an annular port 72 which is continuously open to the area on valve element 64 between lands b and c. Chamber 71 is continuously connected to this same area between lands b and c through a radial flow-restrictive passage 73 and an axially extending central passage 74 in valve element 64.

At the other end of valve element 64 there is an integral axially extending stem 76 contactable with a pressure boost piston 78 which is mounted in a cylinder 79 that is retained in valve body 69. The piston 78 has lands a and b of unequal diameter which cooperate with cylinder 79 whose bore is stepped accordingly to form chambers 80 and 81. When either one of these chambers is supplied with fluid pressure there is provided a boost pressure the regulated pressure. Valve element 64 is normally biased to the position shown by a spring 82 mounted between the annular end of cylinder 79 and a spring seat 84 which is positioned by a shoulder on valve element 64. With valve element 64 biased to the position shown by spring 82 and on pressure buildup in passage 54 and thus between lands b and c, this pressure is transmitted to chamber 71. The pressure in chamber 71 urges rightward movement of valve element 64 against the spring bias to regulate pressure in the main pressure passage 54 at a low valve determined by the spring bias with excess fluid being exhausted first between lands b and c to a converter feed passage 86 and then between lands a and b to an exhaust port 87 which is connected by a passage 88 to the pump inlet chambers 20. The converter feed passage 86 delivers fluid to the transmission's torque converter such as disclosed in the aforementioned Winchell et al. patent whereafter the fluid is then returned to sump 18. The above-described main pressure regulation assumes that only spring 82 is determining the main pressure. When the transmission control system is conditioned to establish certain drives such as disclosed in the aforementioned Winchell et al. patent, fluid pressure is also delivered to either chamber 80 or 81 where it acts leftward on piston 78 to assist the spring 82 and thereby increase the regulated pressure in transmission main pressure passage 54. For a more detailed description of the regulator valve, reference may be made to the aforementioned Winchell et al. patent.

Describing now a typical operation of the central hydraulic system disclosed above, with the engine idling and thus pump 14 operating at a low speed, fluid is drawn from sump 18 through passage 19 and delivered by the pump to the pump outlet passage 26. Both of the flow-control valves 28 and 30 are positioned by their spring bias so that they do not exhaust and the fluid thus delivered to chamber 38 of flow-control valve 28 passes through flow-restrictive passage 37 to chamber 39 and then through flow-restrictive passage 48 of flow-control valve 30 to chamber 49. Fluid in chamber 49 is delivered through passage 50 to the power steering system 13 from which all fluid flowing thereto is delivered by passage 55 to the transmission main pressure passage 54. When the main pressure passage 54 is filled, pressure then builds in this passage and upstream thereof and the pressure-regulator valve 11 starts operating to regulate transmission main pressure at the desired value.

To aid in understanding the operation of the central hydraulic system according to the present invention, it will be assumed that the power steering system 13 never requires more than 3 gallons per minute for its operation and the transmission control system never requires more than 8 gallons per minute. With these different circuit requirements, the flow-control valve 30 is calibrated to limit flow through flow-restrictive passage 48 to 3 gallons per minute and the flow control valve 28 is calibrated to limit flow through flow-restrictive passage 37 to 8 gallons per minute.

With the above flow-control valve calibrations, when the pump 14 reaches a delivery rate of 3 gallons per minute to the power steering system and thus also to the transmission control system which flow rate will occur at a certain low engine speed, the pressure developed across the flow-restrictive passage 48 moves valve element 46 sufficiently rightward against the bias of spring 51 to open chamber 39 to the transmission main pressure passage 54. Thus, when the pump flow increases beyond 3 gallons per minute on increasing engine speed and thus pump speed, the flow-control valve 30 regulates to limit the flow through flow-restrictive passage 48 to this desired rate by delivering the excess fluid from the pump directly to the transmission control system. Since the 3 gallons per minute being delivered to the power steering system 13 by flow-control valve 30 is also being delivered to the transmission main pressure passage, the entire pump flow up to 8 gallons per minute is thus made available to the transmission control system with the transmission regulator valve 11 regulating the pressure in this latter system at the desired value and exhausting excess fluid back to the pump inlet.

During the operation thus far described, the other flow-control valve 28 has not provided flow control and will continue not to do so until the flow from the pump 14 reaches 8 gallons per minute as the result of increased engine speed. When the pump flow rate reaches 8 gallons per minute the pressure differential developed across flow-restrictive passage 37 moves valve element 36 sufficiently rightward against the bias of spring 41 to open chamber 38 to passage 44. Thus, when the pump flow increases beyond 8 gallons per minute on increasing pump speed, the flow-control valve 28 regulates to limit flow through flow-restrictive passage 38 to this desired rate by delivering the excess fluid from the pump through nozzle 23 to throat 22 of the aspirator 21. The nozzle 23 back pressures the passage 44 to provide a high pressure at the inlet of throat 22 to effect a high-speed jet stream to suck the fluid from the sump 18 and force it through the downstream portion of passage 19 into the pump to prevent cavitation in the pump's inlet.

Thus, it will be appreciated that the central hydraulic system according to the present invention provides for always satisfying the transmission control system's flow requirement before using any fluid for supercharging the pump. Furthermore, this priority establishes the supercharging action in the proper pump speed range since supercharging is most desirable at the high speeds where excess pump flow occurs. Another advantage is that the transmission control system pressure-regulator valve never handles more than the normal amount of flow required for proper transmission operation and therefore can be designed according to normal transmission control system requirements rather than being called on to provide pressure regulation with highly excessive fluid flow thereto. Another advantage is that the throat of the aspirator may operate with pressures higher than the regulated pressure of the transmission control system, this latter feature providing for efficient aspirating action recognizing that the pump outlet pressure will always exceed transmission main pressure since the power steering system is upstream thereof.

The above-described embodiment is illustrative of the invention which may be modified within the scope of the appended claims.

We claim:

1. In a fluid-supply system for a vehicle having an automatic transmission and also power steering, the combination of a pump for delivering fluid under pressure; first flow-control valve means for receiving fluid from said pump and providing a fluid flow rate limited to a predetermined value by exhausting any excess fluid flow; aspirator means for receiving exhausted fluid flow from said first flow-control valve means to effect supercharging of said pump; a power steering system; a transmission control system connected to receive all fluid passing through said power steering system; and second flow-control valve means for receiving the controlled fluid flow from said first control valve means and providing a fluid flow rate to said power steering system limited to a predetermined value lower than that provided by said first flow-control valve means by exhausting any excess fluid flow to said transmission control system.

2. In a fluid-supply system for a vehicle having an automatic transmission and also power steering, the combination of a power steering system; a transmission control system connected to receive all fluid passing through said power steering system; a pump for delivering fluid under pressure; first flow-control valve means for receiving fluid from said pump and providing a fluid flow rate limited to a value meeting the maximum requirement of said transmission control system by exhausting any excess fluid flow; aspirator means for receiving exhausted fluid flow from said first flow control valve means to effect supercharging of said pump; and second flow-control valve means for receiving the controlled fluid flow from said first control valve means and providing a fluid flow rate to said power steering system limited to a value meeting the maximum requirement of said power steering system by exhausting any excess fluid flow to said transmission control system whereby the flow requirement of said transmission control system is met before pump supercharging occurs and said transmission control system does not receive more than its maximum fluid flow requirement.

3. In a fluid-supply system for a vehicle having an automatic transmission and also power steering, the combination of a fluid sump; a pump having an inlet connected to said sump and also having an outlet; first flow control valve means having an inlet connected to the outlet of said pump and also having an outlet and an exhaust and being operable to limit fluid flow from the inlet to the outlet to a predetermined flow rate and deliver any excess fluid flow to the exhaust; aspirator means connected to the inlet of said pump and also to the exhaust of said first flow-control valve means for supercharging the inlet of said pump by using the excess fluid flow from said first flow-control valve means to suction fluid from said sump and force it into the inlet of said pump; second flow-control valve means having an inlet connected to the outlet of said first flow-control valve means and also having an outlet and an exhaust and being operable to limit fluid flow from the inlet to the outlet of said second flow-control valve means to a predetermined flow rate lower than that of said first flow-control valve means and deliver any excess fluid flow to the exhaust of said second flow-control valve means; a power steering system having an inlet connected to the outlet of said second flow-control valve and also having an outlet; a transmission control system including a fluid pressure supply passage connected to the outlet of said power steering system and also to the exhaust of said second flow-control valve means; and said transmission control system also including pressure regulator valve means for regulating the pressure in said fluid pressure supply passage by delivering any excess fluid to the inlet of said pump.

* * * * *

PO-1050
(5/69)

UNITED STATES PATENT OFFICE
CERTIFICATE OF CORRECTION

Patent No. __3,620,646__      Dated __November 16, 1971__

Inventor(s) __Paul D. Stevenson and Leon A. Tucholski__

It is certified that error appears in the above-identified patent and that said Letters Patent are hereby corrected as shown below:

Column 1, line 47, "form" should be -- from --. Column 2, line 6, "3,022,772" should be -- 3,022,722 --; lines 7 - 8, "Centering" should be -- Steering --; line 69 "that" should be -- than --. Column 3, line 13, after "acting" insert -- in --; line 43, after "pressure" (first occurrence), insert -- in --.

Signed and sealed this 30th day of May 1972.

(SEAL)
Attest:

EDWARD M. FLETCHER, JR.
Attesting Officer

ROBERT GOTTSCHALK
Commissioner of Patents